(12) United States Patent
Wikestad

(10) Patent No.: US 12,550,814 B2
(45) Date of Patent: Feb. 17, 2026

(54) ROBOTIC WORKING TOOL SYSTEM AND METHOD

(71) Applicant: HUSQVARNA AB, Huskvarna (SE)

(72) Inventor: Daniel Wikestad, Hestra (SE)

(73) Assignee: HUSQVARNA AB, Huskvarna (SE)

( * ) Notice: Subject to any disclaimer, the term of this patent is extended or adjusted under 35 U.S.C. 154(b) by 699 days.

(21) Appl. No.: 17/914,907

(22) PCT Filed: Mar. 24, 2021

(86) PCT No.: PCT/SE2021/050256
§ 371 (c)(1),
(2) Date: Sep. 27, 2022

(87) PCT Pub. No.: WO2021/206607
PCT Pub. Date: Oct. 14, 2021

(65) Prior Publication Data
US 2023/0138339 A1    May 4, 2023

(30) Foreign Application Priority Data

Apr. 7, 2020  (SE) .................................... 2050391-8

(51) Int. Cl.
*A01D 34/00* (2006.01)
*A01D 101/00* (2006.01)
(Continued)

(52) U.S. Cl.
CPC ........... *A01D 34/008* (2013.01); *G05D 1/648* (2024.01); *G05D 1/6482* (2024.01);
(Continued)

(58) Field of Classification Search
CPC .. A01D 34/008; A01D 2101/00; G05D 1/648; G05D 1/6482; G05D 1/2246;
(Continued)

(56) References Cited

U.S. PATENT DOCUMENTS 11,467,603 B2 * 10/2022 Kim ......................... A47L 9/28
2016/0174459 A1 * 6/2016 Balutis ................. A01D 34/008
701/25

(Continued)

FOREIGN PATENT DOCUMENTS

CN          110809745 A       2/2020
DE      102017113612 A1      12/2018
(Continued)

OTHER PUBLICATIONS

International Search Report and Written Opinion for International Application No. PCT/EP2021/058398 mailed Jul. 1, 2021.
(Continued)

*Primary Examiner* — Michael J Zanelli
(74) *Attorney, Agent, or Firm* — Burr & Forman

(57) ABSTRACT

The present disclosure relates to a robotic working tool system comprising a robotic working tool (1), and a navigation arrangement enabling the robotic working tool to navigate within a working area (3) defined by a working area boundary (13). A recording unit (62) is used to establish at least first and second sub-areas (21-47), defined by closed perimeters. A mapping unit (60) is used to provide the working area to the robotic working tool (1) as a composite area (49, 51) with a closed perimeter, which is defined by the union of said first and second sub-areas (21-47).

6 Claims, 4 Drawing Sheets

(51) Int. Cl.
    *G05D 1/648* (2024.01)
    *G05D 105/15* (2024.01)
    *G05D 107/20* (2024.01)

(52) U.S. Cl.
    CPC ..... *A01D 2101/00* (2013.01); *G05D 2105/15* (2024.01); *G05D 2107/23* (2024.01)

(58) Field of Classification Search
    CPC ........ G05D 1/2297; G05D 1/646; G05D 1/43; G05D 2105/15; G05D 2107/23; G05D 2109/10
    See application file for complete search history.

(56) References Cited

U.S. PATENT DOCUMENTS

| | | | |
|---|---|---|---|
| 2016/0306359 A1* | 10/2016 | Lindhé | G05D 1/0248 |
| 2018/0004217 A1 | 1/2018 | Biber et al. | |
| 2018/0074508 A1 | 3/2018 | Kleiner et al. | |
| 2018/0232134 A1 | 8/2018 | Ebrahimi et al. | |
| 2018/0361584 A1 | 12/2018 | Williams et al. | |
| 2019/0025838 A1 | 1/2019 | Artes et al. | |
| 2019/0120633 A1 | 4/2019 | Afrouzi et al. | |
| 2019/0171214 A1 | 6/2019 | Cestonaro et al. | |
| 2020/0077860 A1 | 3/2020 | Lamon et al. | |

FOREIGN PATENT DOCUMENTS

| | | | |
|---|---|---|---|
| EP | 2078996 A2 | 7/2009 | |
| EP | 3470950 A1 | 4/2019 | |
| EP | 3557355 A1 | 10/2019 | |
| JP | 2016533736 A | 11/2016 | |
| KR | 20190119234 A | 10/2019 | |
| WO | WO-2018182478 A1 * | 10/2018 | ........... A01D 34/008 |
| WO | 2018215092 A1 | 11/2018 | |
| WO | 2019167199 A1 | 9/2019 | |
| WO | 2019167205 A1 | 9/2019 | |
| WO | 2019167207 A1 | 9/2019 | |

OTHER PUBLICATIONS

Office Action and Search Report for Swedish Application No. 2050579-8 mailed on Dec. 22, 2020.

* cited by examiner

ROBOTIC WORKING TOOL SYSTEM AND METHOD

TECHNICAL FIELD

The present disclosure relates to a robotic working tool system comprising a robotic working tool, and navigation arrangement enabling the robotic working tool to navigate within a working area defined by a working area boundary.

BACKGROUND

Such robotic work tools systems, for instance comprising robotic lawn mowers, are widely used. Typically, the working area boundary is marked by burying a boundary wire in the ground and feeding a signal to the wire that can be detected by the robotic lawnmower's navigation arrangement, thereby enabling it to detect the boundary and remain in the working area.

One general problem associated with such robotic work tools is that they are cumbersome and difficult to install.

SUMMARY

One object of the present disclosure is therefore to provide a robotic work tool system that can be more easily installed.

This object is achieved by means of a robotic work tool system as defined in claim 1. More specifically, in a system of the initially mentioned kind, a recording unit is provided, configured to establish at least a first sub-area, defined by a first closed perimeter, and a second sub-area, defined by a second closed perimeter, and a mapping unit configured to provide said working area to the robotic working tool as a composite area with a closed perimeter, which composite area is defined by the union of said first and second sub-areas. In this way, an end user can easily establish a working area by recording a number of simple, small parts of the total working area, which are much easier to encompass one by one. Those small parts are then merged by the system into a composite area.

The sub-areas may be partially overlapping or non-contiguous. In the latter case, the recording unit may further be configured to record a transition path from the first sub-area to the second sub-area which path may be included as data in the composite area.

It is possible to tag at least one sub-area is tagged with a property.

The present disclosure further considers a method for operating a working tool system. At least a first sub-area, defined by a first closed perimeter, and a second sub-area, defined by a second closed perimeter, are recorded. There is established a composite area with a closed perimeter, which composite area is defined by the union of said first and second sub-areas, and navigating the robotic working tool using the composite area.

The present disclosure further considers a robotic working tool system and a corresponding method for operating a working tool system, the system comprising a robotic working tool, where there is recorded at least a first sub-area, defined by a first closed perimeter, and a second sub-area, defined by a second closed perimeter, and the first and second sub-areas are at least partly overlapping. In a first step, one of the overlap between the first and second sub-areas and the complement to the overlap between the first and second sub-areas is processed and, in a second step, the other of the overlap between the first and second sub-areas and the complement to the overlap between the first and second sub-areas is processed. According to embodiments, the method may further comprise establishing a composite area with a closed perimeter, which composite area is defined by the union of the first and second sub-areas, wherein the robotic working tool navigates using the composite area. The composite area may be established in accordance with any of the embodiments defined herein.

The present disclosure further considers a robotic working tool system and a corresponding method for operating a working tool system, the robotic working tool system comprising a robotic working tool, a navigation arrangement enabling the robotic working tool to navigate within a working area defined by a working area boundary, and a recording unit configured to establish at least a first sub-area defined by a first closed perimeter and a second sub-area, defined by a second closed perimeter, wherein the first and second sub-areas are at least partly overlapping; and a mapping unit configured to provide said working area to the robotic working tool as a composite area with a closed perimeter, which composite area is defined by the second sub-area minus the overlap between said first and second sub-areas.

DETAILED DESCRIPTION

Figure 1:
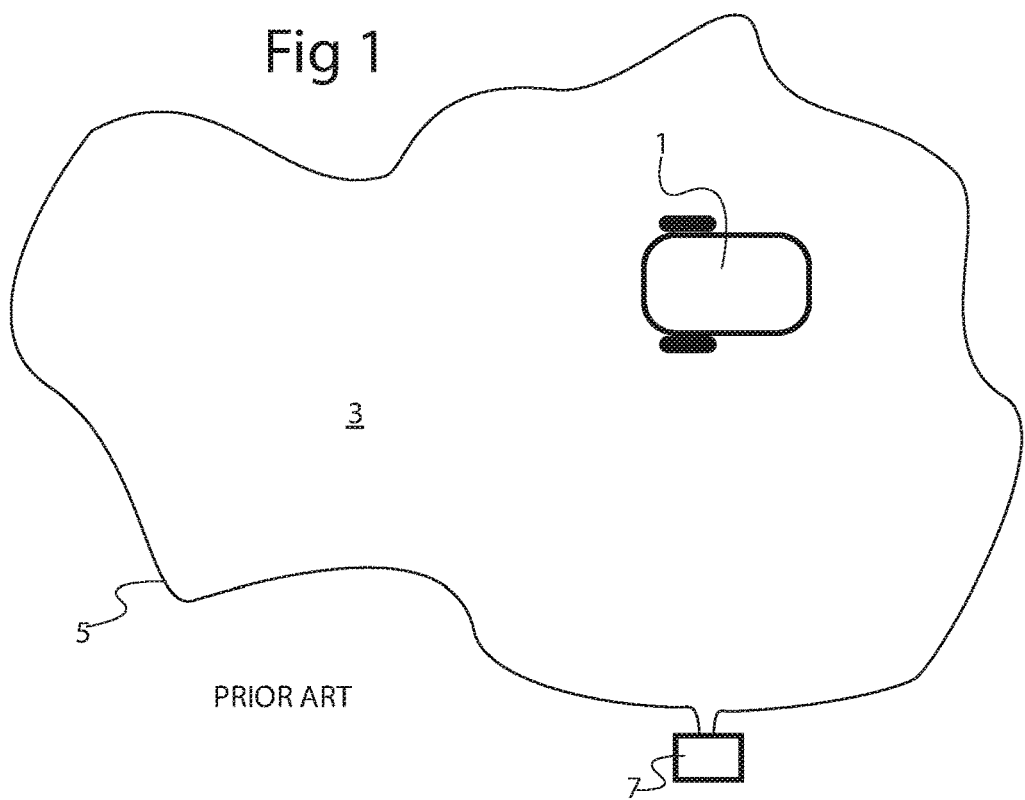
FIG. 1 illustrates schematically a self-propelled robotic tool system according to known art.

The present disclosure relates generally to self-propelled robotic work tools. FIG. 1 illustrates schematically a self-propelled robotic tool 1 operating according to known art. Typically, such a robotic tool 1 operates within a work area 3 which is defined by a buried boundary cable 5. This cable 5 may be connected to e.g. a charging station 7, also capable to intermittently charge the robotic tool 1. A signal is applied to the cable 5, allowing the robotic tool 1 to sense that it is about to cross the cable 5 and exit the working area 3. Thereby, the robotic tool 1 can change its heading accordingly and remain within the working area 3, which is important for efficiency and safety reasons.

As it however is cumbersome to install this system, specifically burying the cable in the ground, it has been suggested to use other means than a boundary cable 5 to keep the robotic tool 1 within the working area 3. One such option is satellite navigation, preferably enhanced with real time kinematics, RTK, capable of enhancing position determining with up to centimeter-level accuracy. RTK is well known per se. Other means for navigating without a boundary wire and with high precision such as using local beacons would also be possible.

When using a boundary wire free system, the positions corresponding to the working area should be established for the robotic working tool, such that it becomes capable of navigating therein. This may be a difficult task that becomes time-consuming when installing a robotic work tool system.

Figure 2:
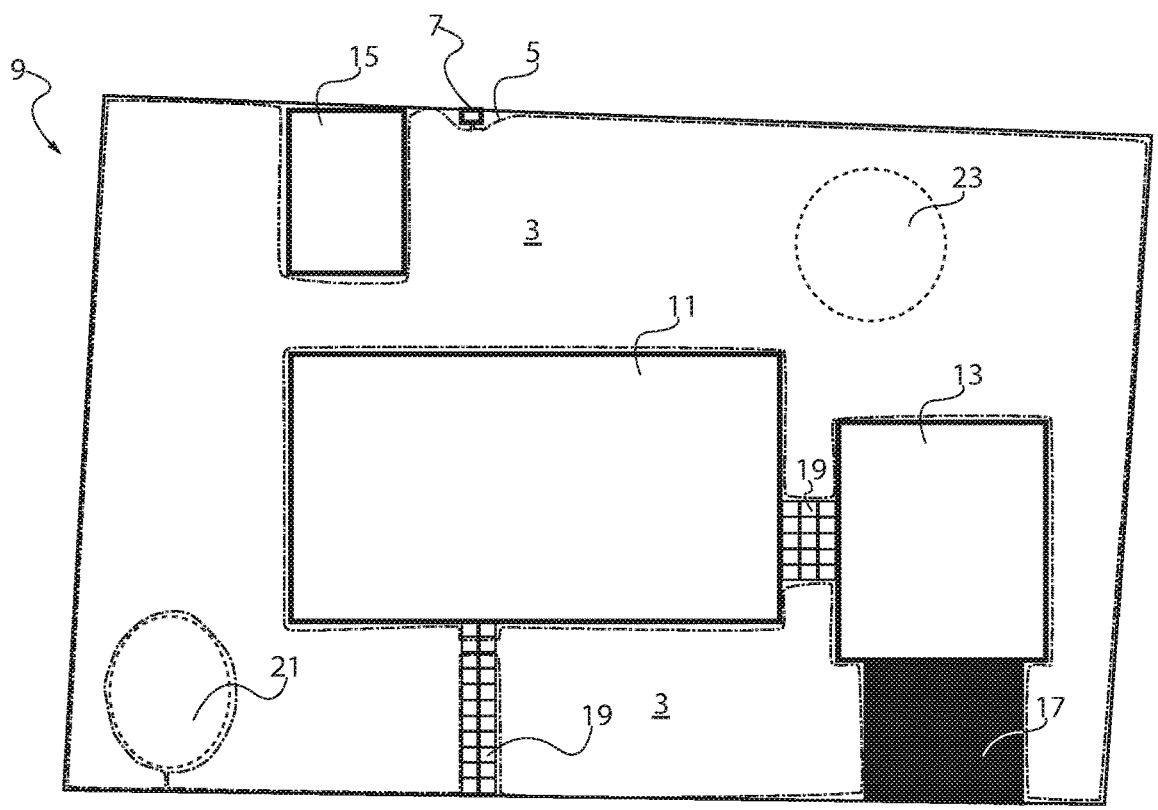
FIG. 2 illustrates schematically a garden with a relatively complex layout, where a boundary cable is used to limit the robotic tool movement.

FIG. 2 illustrates schematically a garden, where a boundary cable 5 is used to limit the robotic tool movement. Compared with the layout in FIG. 1, this garden is relatively complex although being a quite normal garden. The overall plot 9 includes a house 11, a garage 13, and a shed 15. In addition to this, there is a driveway 17 to the garage 13 and areas with paving 19, that are not supposed to be cut, leaving a number of lawn sub-areas. One of those areas 21 should not be cut, at least during a part of the growing season, for instance if tulips grow there. Therefore, the cable 5 makes a loop excluding this area. In another area 23, it would be desirable to have the lawn cut only under some conditions, although a boundary cable system is not capable of dealing with such features. For instance, if outdoor furniture is located in that area 23, it may be desired to have the area cut only on Wednesdays when the furniture is temporarily moved out of the area.

As can be seen in FIG. 2, it would be possible to make a complete garden installation with a boundary cable 5 connected to a charging station 7. However, that installation would be very difficult, the cable being very long, and would include a loop excluding the area not to be cut and would require a passage under the paving 19 in the bottom part.

In a boundary wire free system, it would be possible to establish an overall boundary corresponding to the boundary cable 5 in FIG. 2. This could be done by manually steering the robotic work tool 1 along a path corresponding to the boundary cable 5 illustrated in FIG. 2, for instance using a joystick, and thereby recording the corresponding positions in a memory in the robotic work tool. However, that as well would be a complicated operation, and very time-consuming.

The present disclosure therefore proposes an improved manner for providing the robotic work tool with corresponding work area or boundary data.

Very briefly, this is accomplished in a robotic working tool system of the above-mentioned type by establishing at least a first sub-area, defined by a first closed perimeter, and a second sub-area, defined by a second closed perimeter. Then, a composite area with at least one closed perimeter is obtained, which composite area is defined by the union of said first and second sub-areas is accomplished that can be used by the robotic work tool as a working area.

Figure 3:
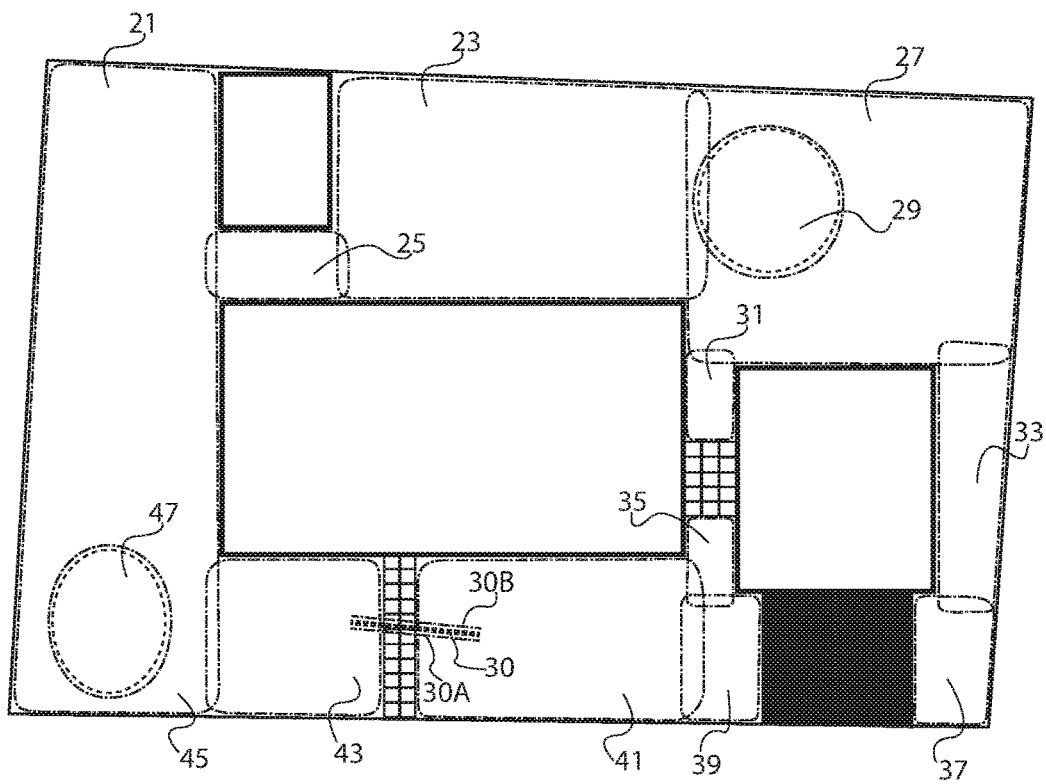
FIG. 3 illustrates schematically how the garden of FIG. 2 could be recorded for a boundary cable free installation according to the present disclosure.

FIG. 3 illustrates schematically how the garden of FIG. 2 could be recorded for a boundary cable free installation. In the garden, a number of sub-areas 21-47 are recorded. Each of those can be recorded as a rather small and simple parcel, that an end user can encircle in a few seconds with a recording device. The recording device may for example be the robotic tool 1 itself, for encircling the sub-areas directly in the terrain, or a handheld device comprising a graphical user interface, for encircling the area on a map. Those parcels can optionally further be tagged with labels at recording. For instance, the forbidden sub-area 47, where cutting is not intended to take place at least during a part of the growing season can be tagged as such. The sub-area 29 where cutting is intended to take place during one day of the week only can be tagged as such by the user. The robotic lawn mower can thus process the overlap between two areas at one occasion and the complement to this overlap at another occasion.

It is further possible to record preferred transition paths 30 in between non-contiguous areas. By a transition path 30 is simply meant a path between two sub-areas, which in the illustrated cases passes over a paved area 19. The transition path 30 may be defined as a narrow area between mutually closely positioned lateral perimeters 30A, 30B parallel to the path 30, which lateral perimeters 30A, 30B together with the perimeters of the otherwise non-contiguous areas form a joint area having a single perimeter, if desired. Cutting need not take place when following a transition path 30.

Figure 4:
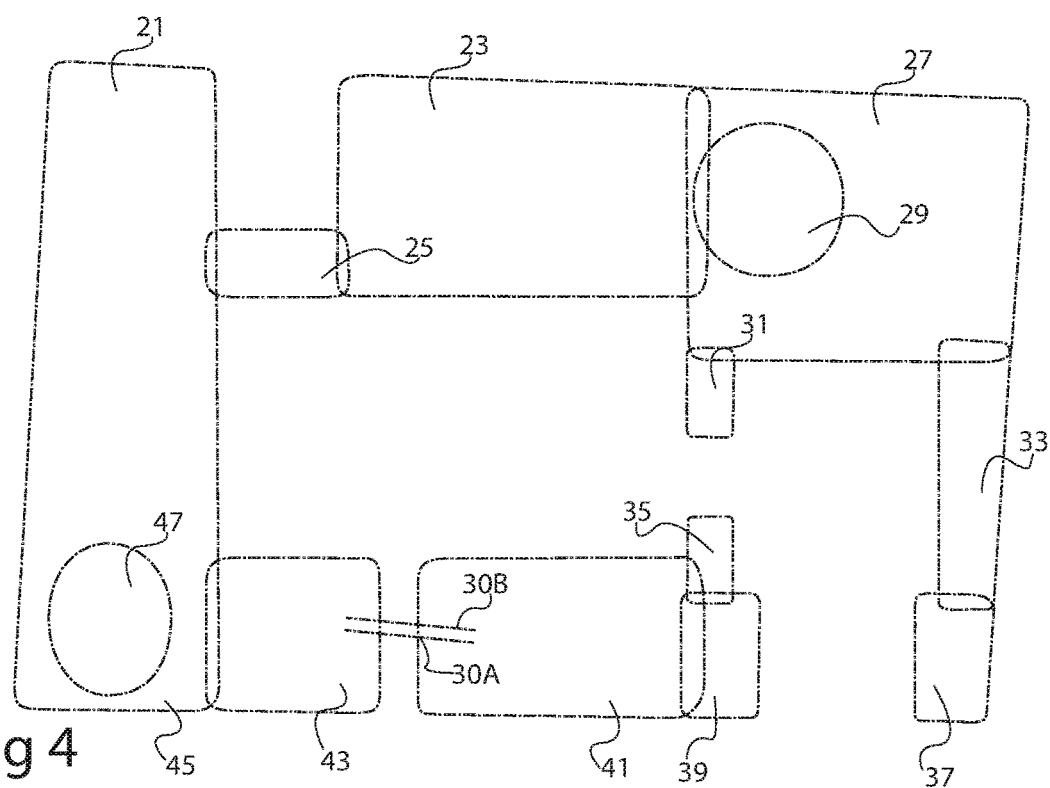
FIG. 4 illustrates sub-areas recorded in FIG. 3.
Figure 5:
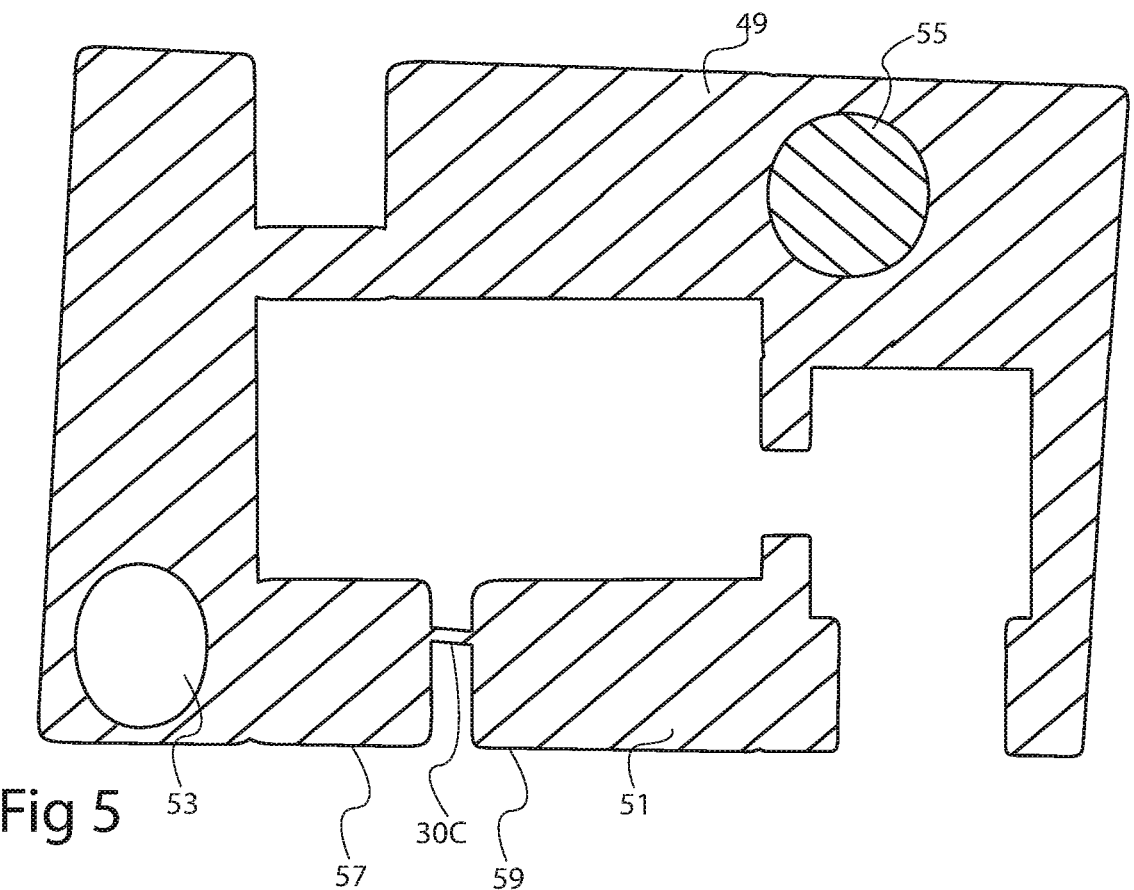
FIG. 5 illustrates how sub-areas of FIG. 4 are merged into composite areas.

FIG. 4 illustrates sub-areas recorded in FIG. 3. This procedure thus records several separate sets of geographical data, which are much easier to obtain than recording data concerning the entire plot. As illustrated in FIG. 5, those sub-areas may then be merged into composite areas 49, 51, which are defined by outer perimeters 57, 59, 30C. Sub-areas may be overlapping or separate from each other. In addition to accomplishing an outer boundary this way, areas 53, 55 within this boundary where special conditions apply may be established. As is apparent from the sub-area 53, a composite area may also be defined by subtracting a first sub-area 47 (FIG. 4), overlapping with a second sub-area 54 (FIG. 4), from the second sub-area 54.

Similarly, if the first and second sub-areas 47, 45 are positioned such that the perimeter of the first sub-area 47 crosses the perimeter of the second sub-area 45, a new, closed outer perimeter may be defined for the composite area thus obtained.

Figure 6:
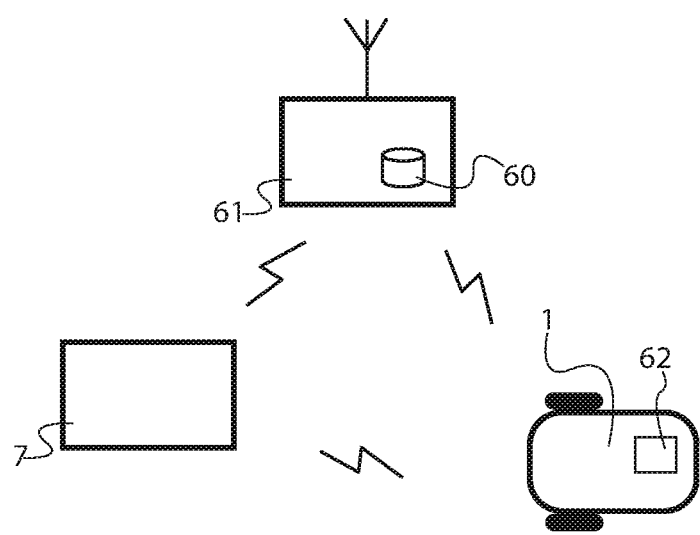
FIG. 6 schematically illustrates a robotic tool system.

FIG. 6 schematically illustrates a robotic tool system. As a minimum, a robotic tool system may comprise the robotic working tool 1. It is possible to carry out all operations needed to record and establish composite areas 49, 51 in the robotic working tool 1, simply by moving the robotic working tool 1 around the perimeters of the sub-areas 21-47 and to merger the corresponding positions into composite areas 49, 51. To this end, the robotic work tool 1 may include a navigating unit that also functions as a recording unit 62 configured to establish the above sub-areas by recording the perimeters of those sub-areas. The robotic work tool 1 may also comprise a mapping unit 60, configured to establish a composite area with a closed perimeter, defined by the union of the sub-areas. It is however also possible to let another device carry out the operations transforming data corresponding to the sub-areas 21-47 into composite areas 49, 51. This may thus also be carried out in another device receiving data corresponding to the sub-areas 21-47. That other device can be the charging station 7, if used, or a remote server 61 in communication with the robotic tool 1, directly or via the charging station 7. In the illustrated case, the mapping unit 60 is associated with such a remote server 61 The composite areas 49, 51 are, if so, subsequently transferred back to the robotic working tool 1 to be used for navigation.

As yet another alternative, it is possible to acquire position data from a third-party mapping service e.g. linking graphical maps such as drone or satellite photos to positions. Using for instance a graphical user interface, GUI, in e.g. a smartphone or tablet it is then possible to establish sub-areas from the graphical maps and merging sub-areas into composite areas. The corresponding position data together with preferred processing sequences can then be transferred to the robotic tool 1.

Figure 7:
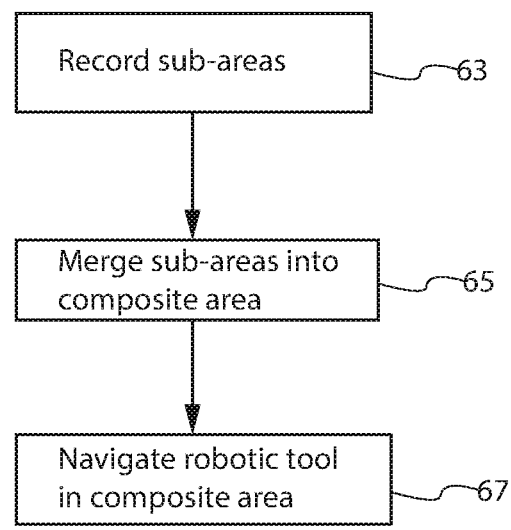
FIG. 7 illustrates a flow chart for a method according an example of the present disclosure.

FIG. 7 illustrates a flow chart for a method according an example of the present disclosure. In a simple form, that method includes recording 63 sub-areas, merging 65 the sub-areas into one or more composite areas, and navigating 67 the robotic tool in the one or more composite areas.

The present disclosure is not limited to the above-described examples and may be varied and altered in different ways within the scope of the appended claims.

The invention claimed is:

1. A robotic working tool system comprising a robotic working tool, and a navigation arrangement enabling the robotic working tool to navigate within a working area defined by a working area boundary, characterized by
   a recording unit configured to establish at least a first sub-area, defined by a first closed perimeter, and a second sub-area, defined by a second closed perimeter; and
   a mapping unit configured to provide said working area to the robotic working tool as a composite area with a closed perimeter, the composite area being defined by a union of said first and second sub-areas,
   wherein the first and second sub-areas are non-contiguous and separated by a non-working area,
   wherein the recording unit is further configured to record a transition path from the first sub-area to the second sub-area through the non-working area, and
   wherein the transition path is included in the composite area.

2. The robotic working tool system according to claim 1, wherein at least one sub-area is tagged with a property.

3. The robotic working tool system of claim 1,
   wherein the composite area is defined by the second sub-area minus an overlap between said first and second sub-areas.

4. A method for operating a working tool system, the system comprising a robotic working tool, the method comprising recording a first sub-area, defined by a first closed perimeter, and a second sub-area, defined by a second closed perimeter, establishing a composite area with a closed perimeter, the composite area being defined by a union of said first and second sub-areas, and navigating the robotic working tool using the composite area,
   wherein the first and second sub-areas are non-contiguous and are separated by a non-working area,
   wherein a recording unit is further configured to record a transition path from the first sub-area to the second sub-area through the non-working area, and
   wherein the transition path is included in the composite area.

5. The method of claim 4,
   wherein the method further comprises establishing the composite area as being defined by the second sub-area minus an overlap between said first and second sub-areas.

6. A method for operating a working tool system, the system comprising a robotic working tool, the method comprising:
   recording via a recording unit at least a first sub-area, defined by a first closed perimeter, and a second sub-area, defined by a second closed perimeter, establishing a composite area with a closed perimeter, wherein the first and second sub-areas are at least partly overlapping, and
   navigating the robotic working tool via a navigation unit by processing, in a first step, one of an overlap between the first and second sub-areas and a complement to the overlap between the first and second sub-areas and, in a second step, the other of the overlap between the first and second sub-areas and the complement to the overlap between the first and second sub-areas
   wherein the first and second sub-areas include a portion that is non-contiguous and are separated by a non-working area,
   wherein the recording unit is further configured to record a transition path from the first sub-area to the second sub-area through the non-working area, and
   wherein the transition path being included in the composite area.

* * * * *